(12) United States Patent
Maloney et al.

(10) Patent No.: US 7,909,508 B2
(45) Date of Patent: Mar. 22, 2011

(54) SENSOR ASSEMBLY FOR A POWER BUS

(75) Inventors: Lloyd A. Maloney, Beaver, PA (US); Deborah K. Mort, Coraopolis, PA (US)

(73) Assignee: Eaton Corporation, Cleveland, OH (US)

( * ) Notice: Subject to any disclaimer, the term of this patent is extended or adjusted under 35 U.S.C. 154(b) by 497 days.

(21) Appl. No.: 11/950,089

(22) Filed: Dec. 4, 2007

(65) Prior Publication Data

US 2009/0141433 A1 Jun. 4, 2009

(51) Int. Cl.
*G01K 1/00* (2006.01)
*G01K 7/00* (2006.01)
*G01K 13/00* (2006.01)

(52) U.S. Cl. ......... 374/152; 374/208; 374/163; 374/141

(58) Field of Classification Search .................. 374/152, 374/164, 141, 208
See application file for complete search history.

(56) References Cited

U.S. PATENT DOCUMENTS

| | | | |
|---|---|---|---|
| 5,252,913 A | 10/1993 | Falkowski et al. | |
| 5,319,356 A * | 6/1994 | Yoshino | ........................ 340/584 |
| 7,053,601 B1 | 5/2006 | Fenske et al. | |
| 7,145,322 B2 | 12/2006 | Solveson et al. | |
| 2003/0062886 A1 | 4/2003 | Hastings et al. | |
| 2006/0076838 A1 | 4/2006 | Solveson et al. | |
| 2007/0007968 A1 | 1/2007 | Mauney, Jr. et al. | |
| 2009/0079417 A1 * | 3/2009 | Mort et al. | .................... 324/111 |

* cited by examiner

*Primary Examiner* — Lisa M Caputo
*Assistant Examiner* — Mirellys Jagan
(74) *Attorney, Agent, or Firm* — Martin J. Moran

(57) ABSTRACT

A sensor assembly is provided for a power bus. The power bus exhibits a number of characteristics, such as a temperature. The sensor assembly includes an enclosure having a housing and a base. At least one sensor such as, for example, a temperature sensor, is housed within the enclosure. The sensor (e.g., temperature sensor) senses a corresponding one of the number of characteristics (e.g., temperature) of the power bus. A power supply is housed within the enclosure, and cooperates with the power bus to provide electrical power to the sensor. An elongated fastener fastens the enclosure to the power bus. The base of the enclosure is adjustable with respect to the housing of the enclosure in order to secure the power bus between the housing and the base. The elongated fastener extends around the enclosure and the power bus in order to secure the enclosure to the power bus.

11 Claims, 4 Drawing Sheets

SENSOR ASSEMBLY FOR A POWER BUS

BACKGROUND OF THE INVENTION

1. Field of the Invention

The invention relates generally to sensors for electrical switching apparatus and, more particularly, to sensor assemblies for power busses.

2. Background Information

Electrical sensors of various types are used to detect the characteristics (e.g., without limitation, the flow of electrical current; temperature) of a conductor.

Temperatures sensors, for example, are sometimes employed to determine the temperature of the power busses for electrical switching apparatus such as, for example, circuit switching devices and circuit interrupters such as circuit breakers, contactors, motor starters, motor controllers, and other load controllers. Some temperature sensors are wireless and form, for example, part of a wireless temperature sensor assembly that is adapted to transmit signals to a receiver disposed at a remote location. In addition to the temperature sensor itself, such assemblies typically include a power source, such as a number of power coils, and a printed circuit board. It is important to protect these components while simultaneously thermally and mechanically coupling the temperature sensor to the power bus.

One prior proposal has been to at least partially house the electrical components of the sensor assembly within an enclosure, which is coupled to the power bus. However, such enclosures can typically be used only with a particular size (e.g., without limitation, width; thickness) and shape (e.g., without limitation, flat; round) of power bus bar. Consequently, the utility of such sensor assemblies is limited. Known sensor assemblies also tend to be unnecessarily complex in design making it difficult to, for example, adjust (e.g., re-position) the sensor with respect to the power bus, and increasing the cost not only of the sensor assembly itself, but also for the maintenance, replacement and/or repair thereof.

There is, therefore, room for improvement in sensor assemblies for power busses.

SUMMARY OF THE INVENTION

These needs and others are met by embodiments of the invention, which are directed to a sensor assembly including an enclosure that protects a number of sensor(s) (e.g., without limitation, a number of temperature sensor(s)) and which is adjustable in order to be capable of effectively coupling the sensor assembly to power busses having a wide variety of different sizes and shapes.

As one aspect of the invention, a sensor assembly is provided for a power bus that exhibits a number of characteristics. The sensor assembly comprises: an enclosure comprising a housing and a base; at least one sensor housed within the enclosure and structured to sense a corresponding one of the number of characteristics of the power bus; a power supply structured to cooperate with the power bus to provide electrical power to the at least one sensor; and a fastening mechanism structured to fasten the enclosure to the power bus. The base of the enclosure is structured to be adjustable with respect to the housing of the enclosure in order to secure the power bus between the housing and the base.

The enclosure may further comprise a cover. The housing of the enclosure may comprise a first side, a second side disposed opposite and distal from the first side, a first end, and a second end disposed opposite and distal from the first end. The first side of the housing may be structured to engage the power bus, and the cover may be removably coupled to the second side of the housing. The second end of the housing may include a number of openings, and the cover may include a number of protrusions extending outwardly from the cover toward the housing, wherein each of the number of protrusions of the cover is movably disposed in a corresponding one of the number of openings of the second end of the housing, and wherein the cover is movable toward and away from the second side of the housing in order to access the at least one sensor. The first end of the housing of the enclosure may include a number of apertures, and the base of the enclosure may include a number of protrusions extending outwardly from the base toward the housing, wherein each of the number of protrusions of the base is movably disposed in a corresponding one of the number of apertures of the first end of the housing, and wherein the base is structured to be movable toward and away from the first side of the housing when the power bus is disposed between the first side of the housing and the base.

The fastening mechanism may be an elongated fastener having a first end and a second end disposed opposite and distal from the first end. The cover of the enclosure may comprise a recess, wherein the elongated fastener is structured to extend through the recess and around the enclosure and the power bus. After the elongated fastener is wrapped around the enclosure and the power bus, the first end of the elongated fastener may be structured to be fastened to the second end of the elongated fastener. The recess may be structured to maintain the elongated fastener in a desired position with respect to the enclosure and the power bus. The enclosure may further comprise at least one hole, wherein the elongated fastener is inserted through the at least one hole in order to further secure the elongated fastener in the desired position.

As another aspect of the invention, a sensor assembly is provided for a power bus, which exhibits a number of characteristics. The sensor assembly comprises: an enclosure comprising a housing and a base; at least one sensor housed within the enclosure, and being structured to sense a corresponding one of the number of characteristics of the power bus; a power supply housed within the enclosure, the power supply being structured to cooperate with the power bus to provide electrical power to the at least one sensor; and an elongated fastener structured to fasten the enclosure to the power bus. The base of the enclosure is structured to be adjustable with respect to the housing of the enclosure in order to secure the power bus between the housing and the base, and the elongated fastener is structured to extend around the enclosure and the power bus in order to secure the enclosure to the power bus.

The at least one sensor may be a temperature sensor, wherein the number of characteristics of the power bus is a temperature of the power bus. The temperature sensor may comprise a probe structured to be thermally coupled to the power bus in order to measure the temperature.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
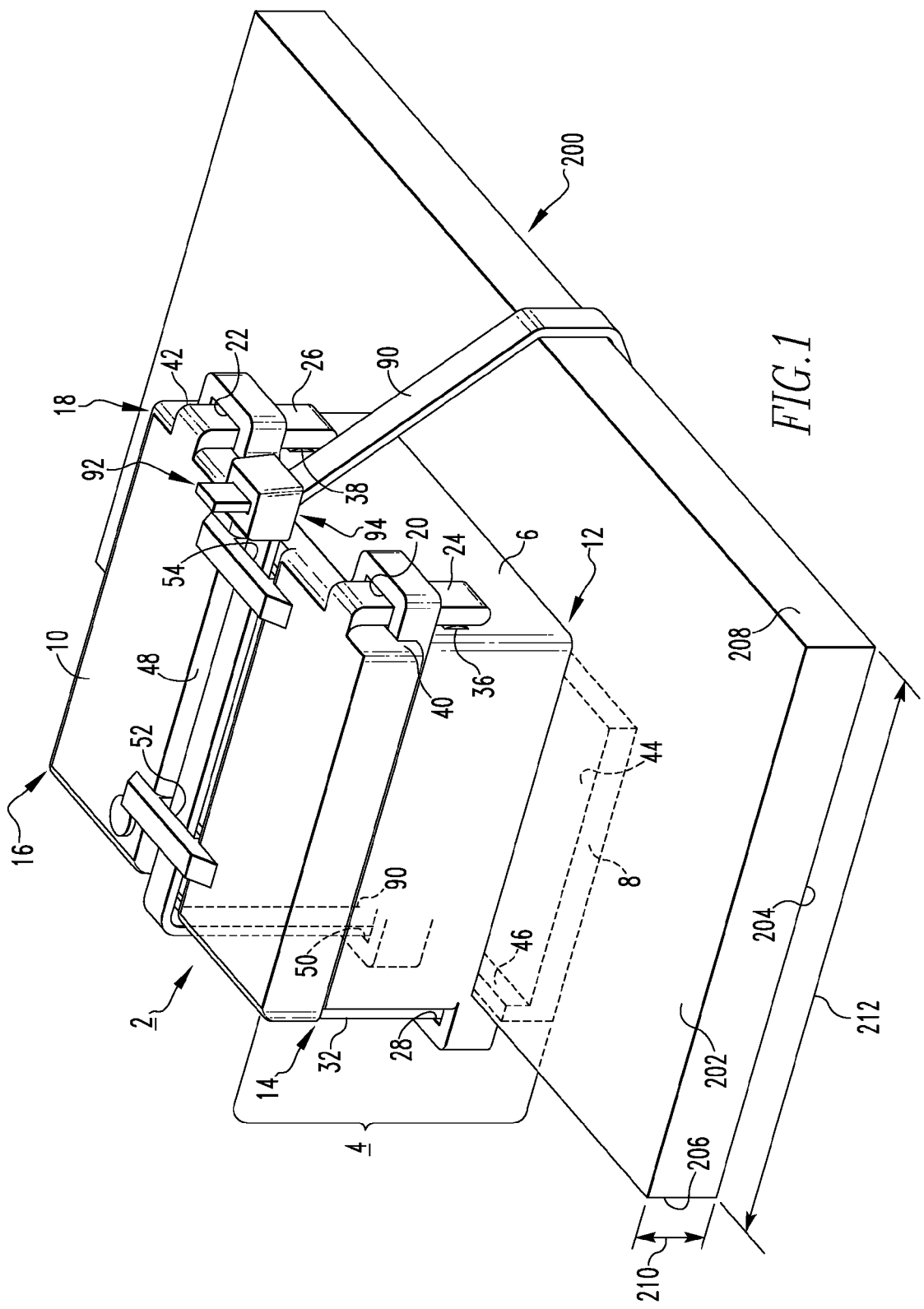
FIG. 1 is an isometric view of a temperature sensor assembly coupled to a power bus, in accordance with an embodiment of the invention.

For purposes of illustration, embodiments of the invention will be described as applied to a wireless temperature sensor for a power bus bar, although it will become apparent that they could also be applied to a wide range of sensors for power busses.

Directional phrases used herein, such as, for example, left, right, front, back, top, bottom and derivatives thereof, relate to the orientation of the elements shown in the drawings and are not limiting upon the claims unless expressly recited therein.

As employed herein, the term "power bus" means a power conductor; a power bus bar; a power line; a power phase conductor; a power cable; and/or a power bus structure for a power source, a circuit interrupter or other switchgear device, or a load powered from the power bus.

As employed herein, the term "wireless" means without a wire, without an electrical conductor and without an optical fiber or waveguide, radio frequency (RF), light, visible light, infrared, ultrasound, wireless area networks, such as, but not limited to, IEEE 802.11 and all its variants (e.g., without limitation, 802.11a; 802.11b; 802.11g), IEEE 802.15 and all its variants (e.g., without limitation, 802.15.1; 802.15.3, 802.15.4), IEEE 802.16 and all its variants, IEEE 802.22 and all its variants, other wireless communication standards (e.g., without limitation, ZigBee™ Alliance standard), HyperLan, DECT, PWT, pager, PCS, Wi-Fi, Bluetooth™, and/or cellular.

As employed herein, the term "aperture" expressly includes, but is not limited to, openings, holes (e.g., without limitation, thru holes; blind holes), slots and recesses.

As employed herein, the term "fastening mechanism" means elongated fasteners such as, for example and without limitation, straps, wires, and wire ties, which are structured to extend around one or more parts to fasten the parts together, as well as interlocking structures such as, for example and without limitation, protrusions of one part that cooperate with corresponding protrusions, recesses or apertures of another part in order to fasten the parts together.

As employed herein, the term "wire tie" refers to any known or suitable elongated fastener (e.g., without limitation, an elongated nylon fastener) including an integrated gear rack, a first end having a ratchet within an open case, and a second end structured to be inserted through the case and past the ratchet resulting in a loop that can only be pulled tighter. The term "wire tie" is sometimes used interchangeably with terms such as, for example and without limitation, "tie wrap," "zip tie," and "cable tie."

As employed herein, the statement that two or more parts are "coupled" together shall mean that the parts are joined together either directly or joined through one or more intermediate parts.

As employed herein, the term "number" refers to the quantity one or an integer greater than one (i.e., a plurality).

Figure 2:
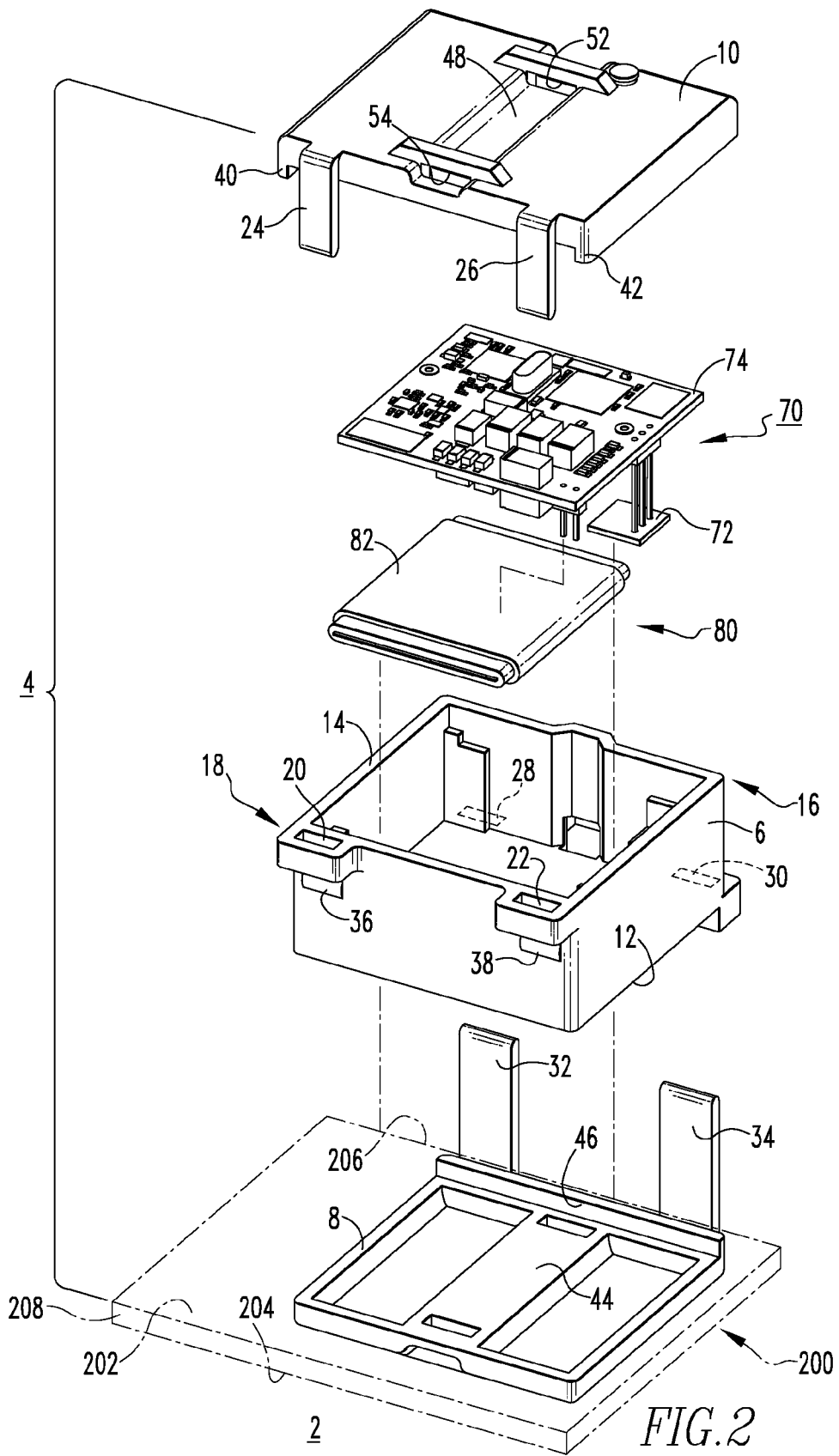
FIG. 2 is an exploded isometric view of the temperature sensor assembly of FIG. 1.

FIGS. 1 and 2 show a sensor assembly 2 structured to be adjustably coupled to a power bus 200 (partially shown in FIG. 1; partially shown in phantom line drawing in FIG. 2) in accordance with an embodiment of the invention. The sensor assembly 2 includes an enclosure 4 having a housing 6 and a base 8 (shown in hidden line drawing in FIG. 1). At least one sensor such as, for example and without limitation, the wireless temperature sensor 70 shown in FIG. 2, is housed within the enclosure 4. In the example shown and described herein, the temperature sensor 70 includes a probe 72 structured to be thermally coupled to the power bus 200 in order to measure the temperature of the power bus 200. The probe 72 extends perpendicularly outwardly from a printed circuit board 74, which is disposed within the housing 6 of the enclosure 4, and is parallel with respect to the power bus 200, as shown in FIG. 2. It will, however, be appreciated that any known or suitable alternative number, type and/or configuration of sensor, other than the temperature sensor 70 described herein, could be employed to measure any known or suitable characteristic (e.g., without limitation, temperature; humidity; current; voltage; frequency; power; power flow; energy) of the power bus 200, without departing from the scope of the invention.

A power supply 80 is structured to cooperate with the power bus 200 to provide electrical power to the sensor 70. For simplicity of illustration, the power supply 80 is shown in simplified form in FIG. 2 (see also power supply 180 of FIG. 3). In the example of FIG. 2, the power supply 80 consists of a power coil 82, which is structured to convert magnetic flux arising from current flowing in the power bus 200 into electrical power for powering the temperature sensor 70. Wireless temperature sensors and power supplies therefor are further described in commonly assigned U.S. Pat. No. 7,145,322, which is incorporated herein by reference. The example enclosure 4 further includes a cover 10, which overlays and protects the electrical components (e.g., without limitation, sensor 70; probe 72; printed circuit board 74; power supply 80 of the sensor assembly 2).

A fastening mechanism 90 (FIGS. 1 and 4) is structured to fasten the enclosure 4 to the power bus 200. As will be described herein, the base 8 (shown in hidden line drawing in FIG. 1) of the enclosure 4 is adjustable with respect to the housing 6 of the enclosure 4 in order to secure the power bus 200 between the housing 6 and the base 8. Specifically, the housing 6 includes first and second opposing sides 12,14 and first and second opposing ends 16,18. The first side 12 of the housing 6 engages the power bus 200, and the aforementioned cover 10 is removably coupled to the second side 14. The example cover 10 is adjustable (e.g., movable toward and away from the second side 14 of the housing 6) by way of a combination of openings 20,22 and corresponding respective protrusions 24,26. The openings 20,22 are disposed on the second end 18 of the housing 6, and the corresponding protrusions 24,26 extend outwardly from the cover 10. Although it will be appreciated that any known or suitable number and/or configuration of protrusions (e.g., 24, 26) and openings (e.g., 20, 22) could be employed, the example enclosure 4 includes first and second openings 20,22 disposed at or about the second side 14 of the housing 6, and first and second protrusions 24,26. The housing 6 further includes first and second retention mechanisms 36,38, which are disposed proximate the first and second openings 20,22, respectively.

As shown in FIG. 1, the first protrusion 24 of the cover 10 extends through the first opening 20 and engages the first retention mechanism 36, and the second protrusion 26 extends through second opening 22 and engages the second retention mechanism 38. In this manner, the cover 10 can be quickly and easily attached to and removed from the second side 14 of the housing 6 in order to access the temperature sensor 70. It will be appreciated that the example retention mechanisms 36,38 are contemplated as comprising molded protrusions which may, for example, have ribs (not shown for simplicity of illustration) structured to engage and secure corresponding portions (not shown) of the protrusions 24,26. It will also be appreciated that although the example cover 10 further includes two lips 40,42 extending perpendicularly outwardly from the cover 10, which overlay corresponding portions (e.g., edges) of a second side 14 of the housing 6 to facilitate proper alignment of the cover 10 with respect to the housing 6, that any known or suitable number and/or configuration of lips (not shown) or other suitable alignment mechanism (not shown), or no lips (not shown), could be employed.

Adjustment of the base 8 with respect to the housing 6 is provided by a suitable combination of apertures 28,30 (both shown in hidden line drawing in FIG. 2) and protrusions 32,34 (both shown in FIG. 2), as will now be discussed. Specifically, the example enclosure housing 6 includes first and second apertures 28,30 (both shown in hidden line drawing in FIG. 2) structured to receive first and second tabs 32,34, respectively, although it will be appreciated that any known or suitable number and/or configuration of apertures (e.g., 28,30) and protrusions (e.g., tabs 32,34) could be employed. In this manner, much as the adjustable cover 10 is adjustable with respect to the housing 6, as previously discussed hereinabove, the base 8 is movable toward and away from the first side 12 of the housing 6 and the power bus 200 when it is disposed between the first side 12 of the housing 6 and the base 8.

The power bus 200 shown and described herein has first and second generally planar sides 202,204 and first and second opposing edges 206,208. Specifically, the power bus 200 is a generally planar member that is rectangular in cross-section and has a thickness 210 and a width 212. The thickness 210 is defined by the distance between the first and second sides 202,204 of the power bus 200, and the width 212 is defined by the distance between the first and second edges 206,208 of the power bus 200. The base 8 of the enclosure 4 adjusts with respect to the housing 6 of the enclosure 4, in order to accommodate the thickness 210 of the power bus 200, and the aforementioned fastening mechanism 90 accommodates the width 212 of the power bus 200, as shown in FIG. 1. In one non-limiting example, the power bus 200 has a thickness 210 of about 0.25 inches to about 0.50 inches. It will, however, be appreciated that the disclosed sensor assembly 2 could be employed with a power bus (not shown) having any known or suitable alternative size (e.g., smaller than 0.25 inches; larger than 0.50 inches; any other suitable dimension) and shape (e.g., without limitation, round; non-rectangular).

The base 8 (shown in hidden line drawing in FIG. 1) preferably includes a planar surface 44, which engages the second side 204 of the power bus 200 (partially shown in phantom line drawing in FIG. 2), and an elongated projection 46, which extends perpendicularly outwardly from the planar surface 44 and engages one of the edges 206,208 of the power bus 200. The base 8 can then be adjusted (e.g., upwardly from the perspective of FIGS. 1 and 2) toward the housing 6 of the enclosure 4, until the first side 12 of the housing 6 engages the first side 202 of the power bus 200 such that the power bus 200 is sandwiched between the base 8 and housing 6, as shown in FIG. 1.

The aforementioned fastening mechanism 90 secures the enclosure 4 of the sensor assembly 2 in the desired predetermined position with respect to the example power bus 200. Preferably, the fastening mechanism is an elongated fastener such as, for example and without limitation, the wire tie 90 shown in FIG. 1, which extends around the enclosure 4 and the power bus 200. Specifically, the elongated fastener 90 has a first end 92 and a second end 94 disposed opposite and distal from the first end 92. The cover 10 of the example enclosure 4 includes a recess 48 (e.g., channel). The elongated fastener 90 extends through the recess 48, and around the enclosure 4 and the power bus 200. After the elongated fastener 90 is wrapped around the enclosure 4 and the power bus 200, the first end 92 of the elongated fastener 90 is fastened to the second end 94. The elongated fastener 90 can then be tightened to form a loop around the assembly, as shown in FIG. 1. The recess 48 of the cover 10 functions to maintain the elongated fastener 90 in the desired position with respect to the enclosure 4. A plurality of holes 50 (shown in hidden line drawing in FIG. 1) 52,54 further guide and maintain the position of the elongated fastener 90. The example enclosure 4 includes a first hole 50 (shown in hidden line drawing in FIG. 1) disposed on the housing 6 of the enclosure 4, and second and third holes 52,54 disposed at or about the guide recess 48 of the cover 10 of the enclosure 4, although it will be appreciated that any known or suitable alternative number and/or configuration of holes or other guide mechanism(s) (not shown) could be employed without departing from the scope of the invention.

Figure 3:
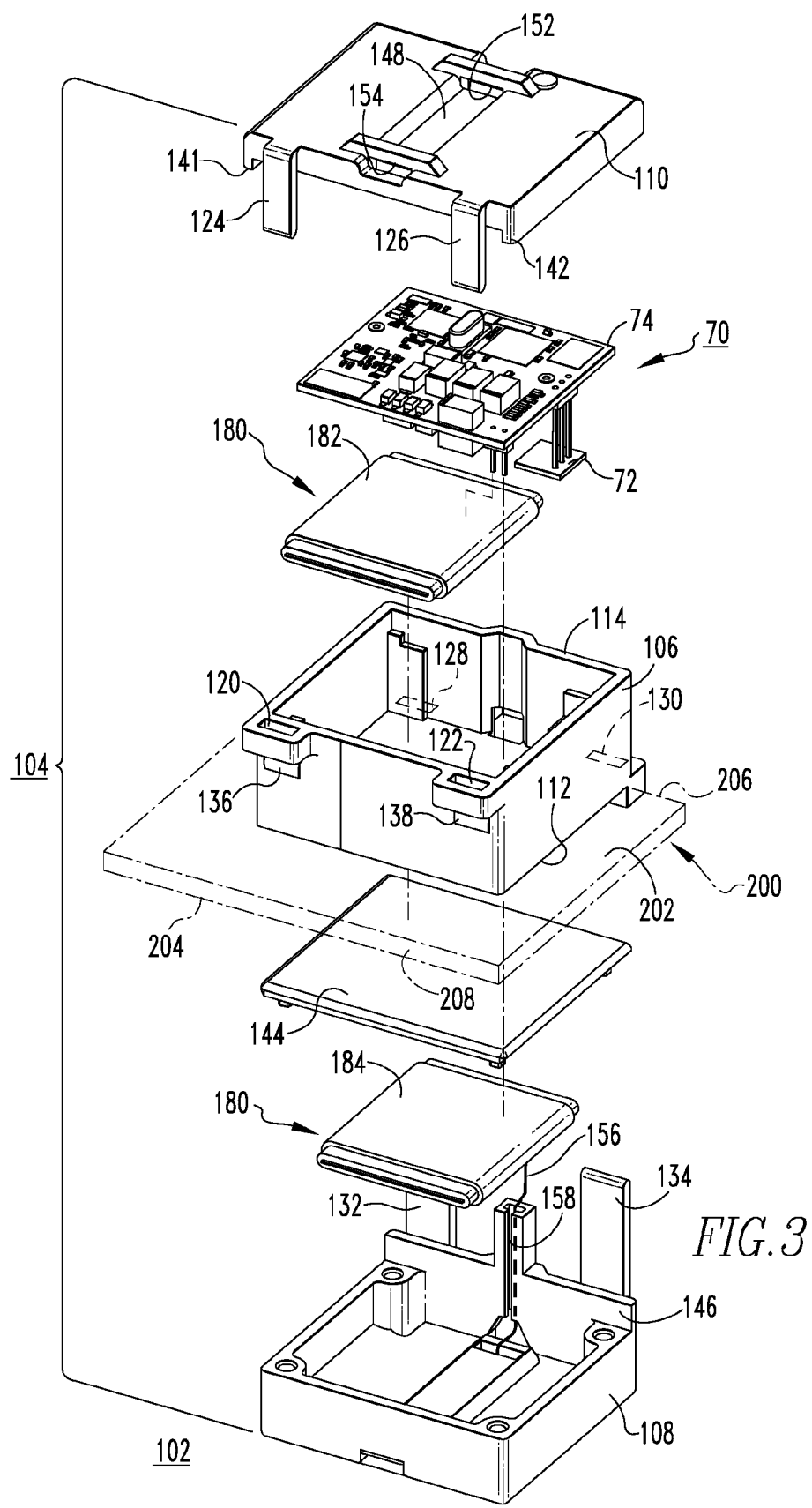
FIG. 3 is an exploded isometric view of a temperature assembly in accordance with another embodiment of the invention.
Figure 4:
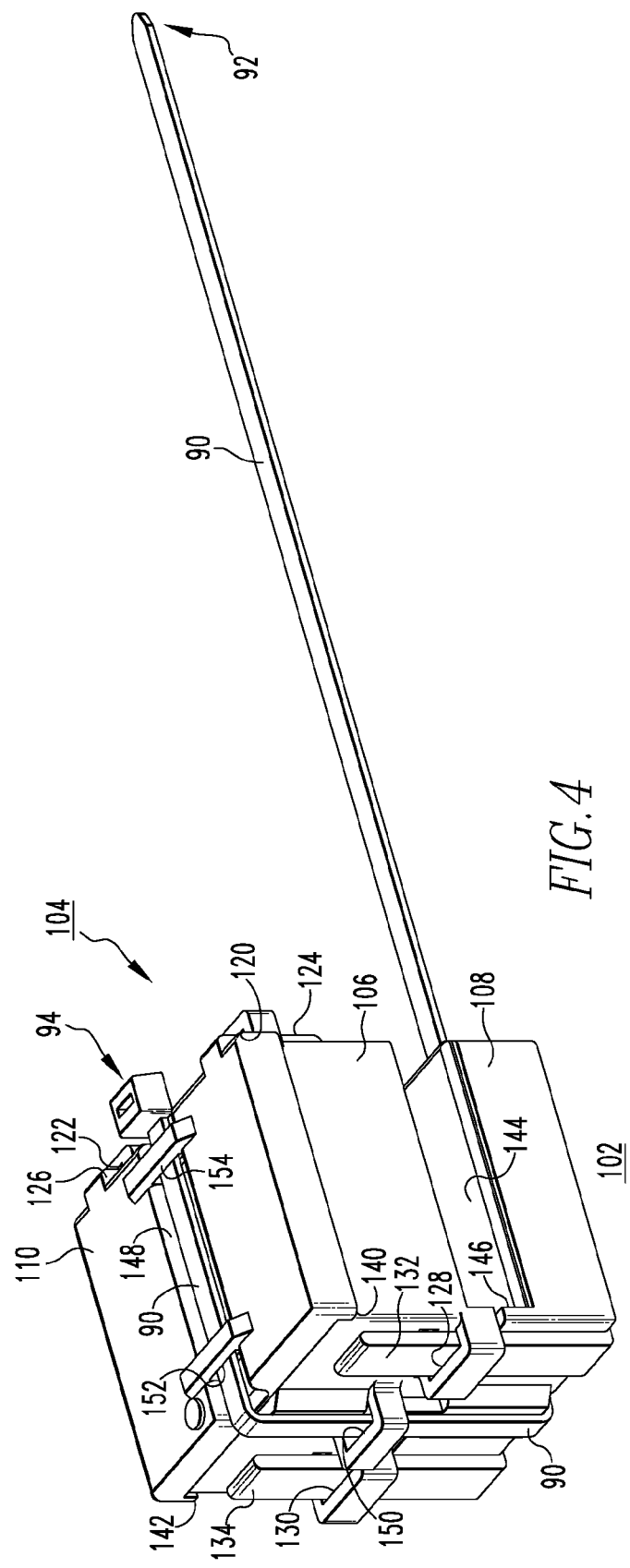
FIG. 4 is an isometric view of the temperature sensor assembly of FIG. 3, shown prior to being coupled to a power bus.

FIGS. 3 and 4 show one non-limiting example of a sensor assembly 102 in accordance with another embodiment of the invention. Specifically, unlike the power assembly 80 of the sensor assembly 2 previously discussed with connection of FIGS. 1 and 2, which included a single power coil 82, the power assembly 180 of sensor assembly 102 includes first and second power coils 182,184, as shown in FIG. 3. The first power coil 182 is disposed in the housing 106 of the enclosure 104 on the first side 202 of the power bus 200 (partially shown in phantom line drawing in FIG. 3; not shown in FIG. 4), and the second power coil 184 is disposed in the base 108 on the second side 204 of the power bus 200. The base 108 of the enclosure 104 also includes a cover member 144, which is structured to overlay the second power coil 184, and a channel 158 (e.g., without limitation, molded passageway) extending outwardly from the base 108 toward the housing 106. The channel 158 receives conductors 156 (e.g., without limitation, electrical wires) that extend from the base 108 toward the housing 106 and/or vice versa.

The remainder of the sensor assembly 102 is substantially the same as sensor assembly 2, previously discussed with respect to FIGS. 1 and 2. Specifically, the base 108 of the example enclosure 104 is adjustable toward and away from the first side 112 of the housing 106 of the enclosure 104 and the power bus 200 (partially shown in phantom line drawing in FIG. 3) by way of protrusions 132,134 that are movably received within corresponding apertures 128,130, respectively, as shown in FIG. 4. An adjustable cover 110 is movably coupled to the second side 114 of the enclosure housing 106 by way of first and second protrusions 124,126 inserted through first and second openings 120,122, respectively. The first and second cover protrusions 124,126 engage first and second securing mechanisms 136,138, respectively, as shown in FIG. 3. In operation, the cover member 144 of the base 108 moves toward (e.g., upward from the perspective of FIG. 3) and engages the second side 204 of the power bus 200, an elongated projection 146 engages the first edge 206 of the power bus 200, and the first side 202 of the power bus 200 is engaged by the first side 112 of the enclosure 106.

As shown in FIG. 4, the elongated fastener 90 is inserted through first, second and third holes 150,152,154, and is disposed in a predetermined position within a recess 148 of the cover 110. Although the fastener 90 and enclosure 104 are shown in FIG. 4 prior to attachment of the sensor assembly 102 to the power bus 200 (partially shown in phantom line in FIG. 3), it will be appreciated that the fastener 90 is employed in substantially the same manner as shown in FIG. 1, and as previously discussed hereinabove with respect thereto.

Accordingly, the disclosed sensor assemblies 2 (FIGS. 1 and 2), 102 (FIGS. 3 and 4) provide a relatively simple mechanism for effectively coupling a sensor (e.g., wireless temperature sensor 70) to a power bus 200 while protecting the sensor 70 within a corresponding enclosure 4 (FIGS. 1 and 2), 104 (FIGS. 3 and 4). Portions (e.g., without limitation, base 8,108 and cover 10,110) of the enclosure 4,104 are adjustable in order to secure the sensor assembly 2,102 to power buses (e.g., 200) having a variety of different sizes and/or shapes. A suitable fastening mechanism such as, for example and without limitation, a wire tie 90, can quickly and easily be employed to surround the enclosure 4,104 and power bus 200 to secure the sensor assembly 2,102 to the power bus 200.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A sensor assembly for a power bus, said power bus exhibiting a number of characteristics, said sensor assembly comprising:
    an enclosure comprising a housing and a base;
    at least one sensor housed within said enclosure, each of said at least one sensor being structured to sense a corresponding one of said number of characteristics of said power bus;
    a power supply structured to cooperate with said power bus to provide electrical power to said at least one sensor;
    a fastening mechanism structured to fasten said enclosure to said power bus;
    wherein the base of said enclosure is structured to be adjustable with respect to the housing of said enclosure in order to secure said power bus between the housing and the base;
    wherein said enclosure further comprises a cover; wherein the housing of said enclosure comprises a first side, a second side disposed opposite and distal from the first side, a first end, and a second end disposed opposite and distal from the first end; wherein the first side of the housing is structured to engage said power bus; and wherein the cover is removably coupled to the second side of the housing; and
    wherein the second end of the housing includes a number of openings; wherein the cover includes a number of protrusions extending outwardly from the cover toward the housing; wherein each of said number of protrusions of the cover is movably disposed in a corresponding one of said number of openings of the second end of the housing; and wherein the cover is movable toward and away from the second side of the housing in order to access said at least one sensor.

2. The sensor assembly of claim 1 wherein said number of openings is a first opening and a second opening; wherein said first opening and said second opening are disposed at or about the second side of the housing; wherein said number of protrusions of the cover is a first protrusion and a second protrusion; wherein the housing further comprises a first retention mechanism disposed proximate said first opening, and a second retention mechanism disposed proximate said second opening; wherein said first protrusion of the cover extends through said first opening and engages said first retention mechanism; and wherein said second protrusion of the cover extends through said second opening and engages said second retention mechanism.

3. A sensor assembly for a power bus, said power bus exhibiting a number of characteristics, said sensor assembly comprising:
    an enclosure comprising a housing and a base;
    at least one sensor housed within said enclosure, each of said at least one sensor being structured to sense a corresponding one of said number of characteristics of said power bus;
    a power supply structured to cooperate with said power bus to provide electrical power to said at least one sensor;
    a fastening mechanism structured to fasten said enclosure to said power bus;
    wherein the base of said enclosure is structured to be adjustable with respect to the housing of said enclosure in order to secure said power bus between the housing and the base;
    wherein said enclosure further comprises a cover; wherein the housing of said enclosure comprises a first side, a second side disposed opposite and distal from the first side, a first end, and a second end disposed opposite and distal from the first end; wherein the first side of the housing is structured to engage said power bus; and wherein the cover is removably coupled to the second side of the housing; and
    wherein the first end of the housing of said enclosure includes a number of apertures; wherein the base of said enclosure includes a number of protrusions extending outwardly from the base toward the housing; wherein each of said number of protrusions of the base is movably disposed in a corresponding one of said number of apertures of the first end of the housing; and wherein the base is structured to be movable toward and away from the first side of the housing when said power bus is disposed between the first side of the housing and the base.

4. The sensor assembly of claim 3 wherein said number of apertures of the first end of the housing of said enclosure is a first aperture and a second aperture; wherein said first aperture and said second aperture are disposed at or about the first side of the housing; wherein said number of protrusions of the base of said enclosure is a first tab and a second tab; wherein the first tab is disposed in said first aperture; and wherein the second tab is disposed in said second aperture.

5. A sensor assembly for a power bus, said power bus exhibiting a number of characteristics, said sensor assembly comprising:
    an enclosure comprising a housing and a base;
    at least one sensor housed within said enclosure, each of said at least one sensor being structured to sense a corresponding one of said number of characteristics of said power bus;
    a power supply structured to cooperate with said power bus to provide electrical power to said at least one sensor;
    a fastening mechanism structured to fasten said enclosure to said power bus;
    wherein the base of said enclosure is structured to be adjustable with respect to the housing of said enclosure in order to secure said power bus between the housing and the base; and
    wherein said power supply comprises at least one power coil; wherein said at least one power coil is structured to convert electric current running through said power bus into electrical power for powering said at least one sensor; and wherein said power bus has a first side and a second side disposed opposite the first side of said power bus; wherein said at least one power coil is a first power coil and a second power coil; wherein said first power coil is structured to be disposed in the housing of said enclosure on the first side of said power bus; and wherein said second coil is structured to be disposed in the base of said enclosure on the second side of said power bus.

6. The sensor assembly of claim 5 wherein said at least one sensor includes a number of conductors extending from the base of said enclosure to the housing of said enclosure; wherein the base comprises a channel extending outwardly from the base toward the housing; and wherein said number of conductors are disposed within said channel.

7. A sensor assembly for a power bus, said power bus exhibiting a number of characteristics, said sensor assembly comprising:
an enclosure comprising a housing and a base;
at least one sensor housed within said enclosure, each of said at least one sensor being structured to sense a corresponding one of said number of characteristics of said power bus;
a power supply structured to cooperate with said power bus to provide electrical power to said at least one sensor;
a fastening mechanism structured to fasten said enclosure to said power bus; wherein the base of said enclosure is structured to be adjustable with respect to the housing of said enclosure in order to secure said power bus between the housing and the base; and
wherein said enclosure further comprises a cover; wherein said fastening mechanism is an elongated fastener having a first end and a second end disposed opposite and distal from the first end; wherein the cover of said enclosure comprises a recess; wherein said elongated fastener is structured to extend through said recess and around said enclosure and said power bus; wherein, after said elongated fastener is wrapped around said enclosure and said power bus, the first end of said elongated fastener is structured to be fastened to the second end of said elongated fastener; and wherein said recess is structured to maintain said elongated fastener in a desired position with respect to said enclosure and said power bus.

8. The sensor assembly of claim 7 wherein said enclosure further comprises at least one hole; and wherein said elongated fastener is inserted through said at least one hole in order to further secure said elongated fastener in said desired position.

9. The sensor assembly of claim 8 wherein said at least one hole is a first hole, a second hole, and a third hole; wherein said first hole is disposed on the housing of said enclosure; and wherein said second hole and said third hole are disposed at or about said recess of the cover of said enclosure.

10. A sensor assembly for a power bus, said power bus exhibiting a number of characteristics, said sensor assembly comprising:
an enclosure comprising a housing and a base;
at least one sensor housed within said enclosure, each of said at least one sensor being structured to sense a corresponding one of said number of characteristics of said power bus;
a power supply structured to cooperate with said power bus to provide electrical power to said at least one sensor;
a fastening mechanism structured to fasten said enclosure to said power bus;

wherein the base of said enclosure is structured to be adjustable with respect to the housing of said enclosure in order to secure said power bus between the housing and the base;
wherein said enclosure further comprises a cover; wherein the housing of said enclosure comprises a first side, a second side disposed opposite and distal from the first side, a first end, and a second end disposed opposite and distal from the first end; wherein the first side of the housing is structured to engage said power bus; and wherein the cover is removably coupled to the second side of the housing;
wherein said power bus has a generally planar first side, a generally planar second side disposed opposite the generally planar first side, a first edge, and a second edge disposed opposite and distal from the first edge; wherein the first side of the housing of said enclosure is structured to engage the generally planar first side of said power bus; and wherein the base of said enclosure is structured to engage the generally planar second side of said power bus; and
wherein the base of said enclosure comprises a planar surface and an elongated projection extending perpendicularly outwardly from said planar surface; wherein said planar surface of the base is structured to engage the generally planar second side of said power bus; and wherein said elongated projection of the base is structured to engage a corresponding one of the first edge of said power bus and the second edge of said power bus.

11. A sensor assembly for a power bus, said power bus exhibiting a number of characteristics, said sensor assembly comprising:
an enclosure comprising a housing and a base;
at least one sensor housed within said enclosure, each of said at least one sensor being structured to sense a corresponding one of said number of characteristics of said power bus;
a power supply structured to cooperate with said power bus to provide electrical power to said at least one sensor;
a fastening mechanism structured to fasten said enclosure to said power bus;
wherein the base of said enclosure is structured to be adjustable with respect to the housing of said enclosure in order to secure said power bus between the housing and the base;
wherein said enclosure further comprises a cover; wherein the housing of said enclosure comprises a first side, a second side disposed opposite and distal from the first side, a first end, and a second end disposed opposite and distal from the first end; wherein the first side of the housing is structured to engage said power bus; and wherein the cover is removably coupled to the second side of the housing;
wherein said power bus has a generally planar first side, a generally planar second side disposed opposite the generally planar first side, a first edge, and a second edge disposed opposite and distal from the first edge; wherein the first side of the housing of said enclosure is structured to engage the generally planar first side of said power bus; and wherein the base of said enclosure is structured to engage the generally planar second side of said power bus;
wherein said power bus has a thickness and a width; wherein the thickness of said power bus is defined by the distance between the first side of said power bus and the second side of said power bus; wherein the width of said power bus is defined by the distance between the first edge of said power bus and the second edge of said power bus; wherein the base of said enclosure is structured to adjust with respect to the housing of said enclosure in order to accommodate the thickness of said power bus; and wherein said fastening mechanism is structured to accommodate the width of said power bus; and wherein said fastening mechanism is a wire tie; and wherein said wire tie is structured to extend around said enclosure and said power bus in order to secure said enclosure to said power bus.

* * * * *